United States Patent [19]

Habegger et al.

[11] Patent Number: 4,979,591
[45] Date of Patent: Dec. 25, 1990

[54] CONVEYOR BELT

[75] Inventors: Fernand Habegger, Biel-Benken; Hans-Rudolf Gubler, Breitenbach, both of Switzerland

[73] Assignee: Habasit AG, Reinach, Switzerland

[21] Appl. No.: 403,676

[22] Filed: Sep. 6, 1989

[30] Foreign Application Priority Data

Sep. 8, 1988 [CH] Switzerland ............. 3370/88

[51] Int. Cl.⁵ .................................. A63F 9/02
[52] U.S. Cl. .................................. 186/68; 198/502.1
[58] Field of Search ............... 198/502.1, 502.3, 350, 198/847; 8/471; 186/60, 61, 68; 40/518, 524–528

[56] References Cited

U.S. PATENT DOCUMENTS

| | | | |
|---|---|---|---|
| 1,082,311 | 12/1913 | Fielding | 40/528 X |
| 3,486,607 | 12/1969 | Hacker et al. | 198/350 X |
| 3,982,625 | 9/1976 | Wentz et al. | 198/577 X |
| 4,781,725 | 11/1988 | Dunn, Jr. et al. | 8/471 |
| 4,795,477 | 1/1989 | Kusumgar et al. | 8/471 |
| 4,820,310 | 4/1989 | Fukui | 8/471 X |

FOREIGN PATENT DOCUMENTS

| | | | |
|---|---|---|---|
| 2816719 | 11/1978 | Fed. Rep. of Germany | 198/847 |
| 2713484 | 1/1979 | Fed. Rep. of Germany. | |
| 387901 | 2/1965 | Switzerland | 198/335 |

Primary Examiner—Joseph E. Valenza
Assistant Examiner—D. Glenn Dayoan
Attorney, Agent, or Firm—Ralph W. Selitto, Jr.

[57] ABSTRACT

A conveyor belt is provided with advertising indicia on a visible surface thereof. A film of transparent plastic covers the visible surface of the conveyor belt to protect the advertising indicia. The conveyor belt can be used in combination with a cashier's counter as a method of advertising to customers in a store.

24 Claims, 2 Drawing Sheets

CONVEYOR BELT

FIELD OF THE INVENTION

The present invention relates to conveyor belts, and, more particularly, to conveyor belts having advertising indicia provided on a visible surface thereof so that the conveyor belts can be employed for advertising purposes.

BACKGROUND OF THE INVENTION

Indicia, such as positional markers, are known to be printed on the surfaces of conveyor belts employed in manufacturing operations. Such indicia provide useful information for controlling the operations of the conveyor belts. The indicia are printed on the conveyor belt by means of color stencils, transfers or screen-prints.

Although the application of indicia increases the utility of the conveyor belt, the advantages are short-lived. Conveyor belts are typically subjected to high dynamic stress as they are guided over the edges of pulleys and guide rollers. The dynamic stresses tax the flexibility of the surface of the belt, which, in turn, erodes the indicia. Pulleys and guide rollers that have small diameters increase the stresses which, as a result, hasten the erosion of the indicia. Furthermore, the means for applying the indicia have proven inadequate in light of abrasion caused by the articles placed on the conveyor belts. Thus, the severe operating conditions to which conveyor belts are subjected shorten the service life of the indicia.

SUMMARY OF THE INVENTION

The present invention relates to a new and improved conveyor belt which includes belt means for transporting articles and advertising indicia provided on a visible surface of the belt means. The advertising indicia are covered and therefore protected by a transparent protective cover applied to the visible surface of the belt means.

The new and improved conveyor belt can be used in combination with a cashier's counter at an exit station in a store. When the customers pay for their articles, they are in full view of the advertising indicia on the conveyor belt.

BRIEF DESCRIPTION OF THE DRAWINGS

For a better understanding of the present invention, reference is made to the following detailed description of various exemplary embodiments considered in conjunction with the accompanying drawings, in which.

DETAILED DESCRIPTION OF THE EXEMPLARY EMBODIMENTS

Figure 1:
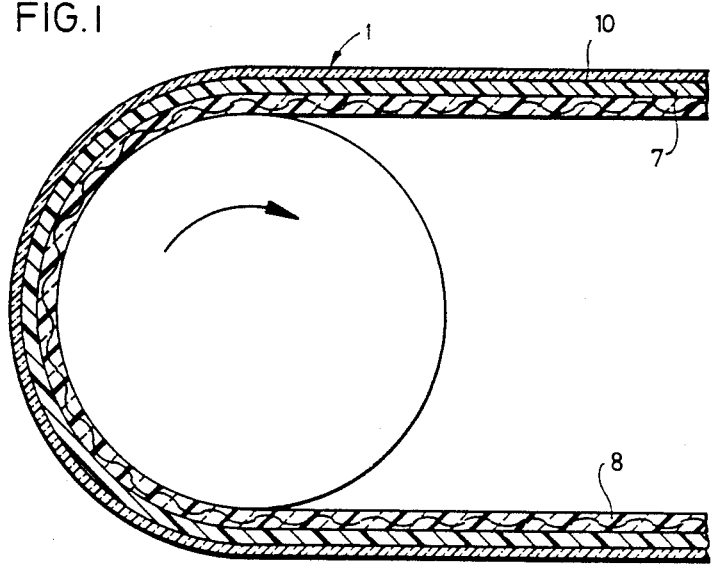
FIG. 1 is cross-sectional view of one exemplary embodiment of a conveyor belt constructed in accordance with the present invention, the conveyor belt being guided by a guide roller.

With reference to FIG. 1, there is shown a conveyor belt 1 which includes a primary belt 7 having a visible outer surface and an inner surface. The primary belt 7, which functions to transport articles placed upon its visible surface, is constructed from a thermoplastic material such as white polyvinyl chloride. A strip of fabric 8, made of multiple plies of a material such as polyester (PES) or polyamide (PA), is attached to the inner surface of the primary belt 7. An artisan of ordinary skill can appreciate that the strip of fabric 8 functions to increase the tensile strength of the primary belt 7, such that the conveyor belt 1 cannot be stretched. To fabricate the primary belt 7, the strip of fabric 8 is coated with the thermoplastic by such means as a melting calender. Resulting is a primary belt 7 having a small thickness and a homogeneous surface.

Indicia 9 are imprinted on the outer surface of the primary belt 7 by the process of transfer-printing. German Patent No. 2,713,484 describes the transfer-printing process as it relates to sheets or webs. However, the same process can be used to print the indicia 9 onto the outer surface of the primary belt 7. The primary belt 7 has a low thickness tolerance and a homogeneous outer surface, thereby making it well-suited for the transfer print. Dye and adhesive are applied to the outer surface of the primary belt 7 from a backing paper at 120 degrees to 160 degrees Centigrade and a pressure of two to six bars during a pressing period of ten to sixty seconds. The indicia 9 does not have to extend over the entire outer surface of the primary belt 7, but rather can occupy marginal areas thereof. However, the geometry and location of the indicia 9 must be in clear view of intended users.

The indicia 9 and the outer surface of the primary belt 7 are covered by a film 10 of transparent plastic. The plastic must be transparent to allow the indicia 9 to be visible. A coating of clear varnish over the plastic film 10 enables easy cleaning. The plastic film 10 provides an anti-friction surface which functions to protect the primary belt 7 and indicia 10 from abrasion and scratches. Additionally, the plastic film 10 is light-fast and protects the primary belt 7 from heat. Thus, the plastic film 10 functions to increase the service life of indicia 9 and the primary belt 7. In addition to functioning as a protective cover, the plastic film 10 provides the primary belt 7 with a high transverse stiffness which prevents the conveyor belt 1 from buckling whenever power is applied thereto or a load is placed thereon.

Figure 2:
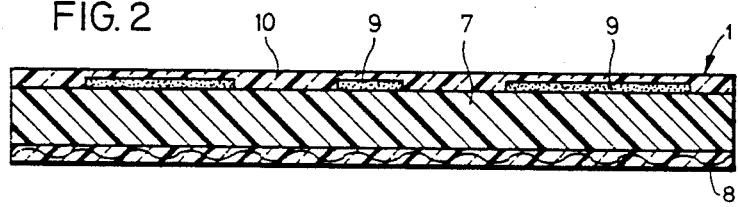
FIG. 2 is a cross-sectional view of a portion of the conveyor belt illustrated in FIG. 1.

As a result of the foregoing construction, the conveyor belt is adapted for use with small diameter pulleys which in itself offers several advantages. For instance, small diameter pulleys allow for good longitudinal flexibility of the conveyor belt 1, which results in low energy consumption upon bending. Reduced bending ensures a flatter position of the conveyor belt 1 whenever power is introduced. The small structural volume of the pulleys results in cost-effective design of the installation and minimized cost. The distance between two conveyor belts 1 in the direction of movement can also be minimized. Because dynamic stresses and tensile and shear loads vary with the weight and dimensions of the articles placed upon the outer surface of the conveyor belt 1, a person skilled in the art must select the thickness and geometries of the primary belt 7, strip of fabric 8 and plastic film 10 accordingly. The thickness of the primary belt 7, strip of fabric 8 and film 10 illustrated in FIGS. 1-2 are not drawn to scale, but instead are chosen only for the purpose of clarity.

The conveyor belt 1 can be employed at locations such as exit points in stores, airport check-outs and manufacturing plants. The information conveyed by the indicia is adapted to the environment. For instance, indicia 9 on a conveyor belt 1 located adjacent a cashier's counter in a store would convey advertisements that would transform the conveyor belt 1 into a moving billboard. Alternately, the indicia 9 could depict decorative designs or artistic images to create a more pleasant and productive working environment. By combining friendly colors and landscapes, the imprinted conveyor belt 1 would help the working staff avoid fatigue and eye strain. In addition to benefitting the employees, the designs and images would also arouse consumer interest. If the conveyor belt 1 is used in industrial applications, such as manufacturing or assembly processes, the indicia 9 would convey optical information, such as bar codes, or magnetically retrievable information which would indicate the position of packages, or control the industrial process.

Figure 4:
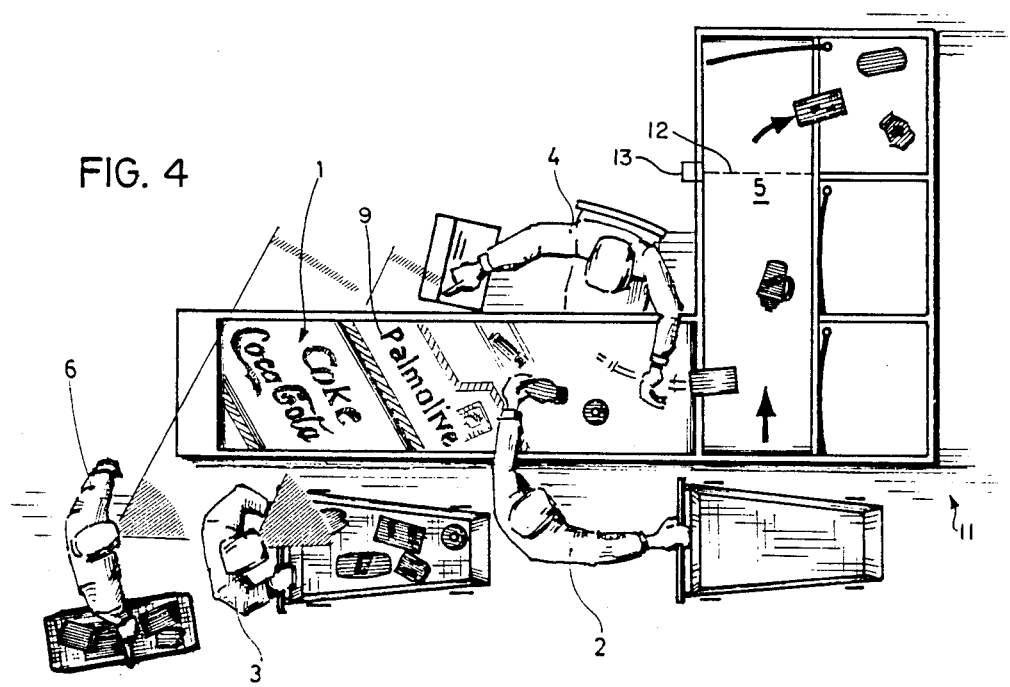
FIG. 4 is a top plan view of the exit station illustrated in FIG. 3.
Figure 3:
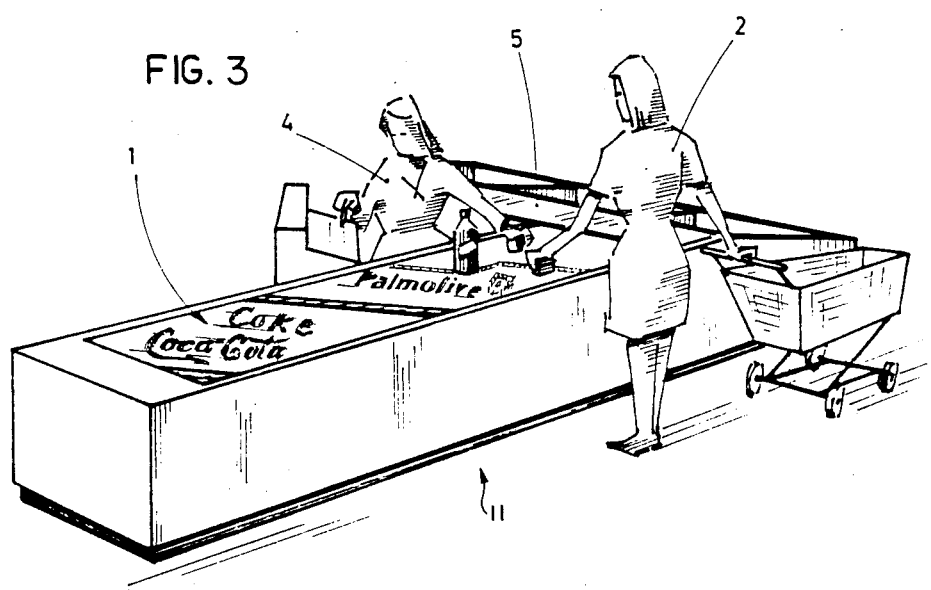
FIG. 3 is a perspective view of an exit station employing a pair of conveyor belts constructed in accordance with the present invention.

Referring now to FIGS. 3-4, the conveyor belt 1 is located adjacent a cashier's counter at an exit station 11 in a store, another conveyor belt 5 being oriented transversely with respect to the conveyor belt 1. The conveyor belt 1 is provided with indicia 9 for conveying advertisements. A customer 2 deposits his articles on the conveyor belt 1. Because the articles occupy only a small area of the conveyor belt 1, the indicia 9 are within the field of view of all customers, including customer 3, who is standing directly behind customer 2, and customer 6 who has just arrived at the exit station 11. As the conveyor belt 1 is advanced, the advertising indicia 9 revolve in the manner of a moving billboard. A cashier 4 pushes the articles off the conveyor belt 1 and into designated packing areas on the conveyor belt 5.

Referring with particularity to FIG. 4, the conveyor belt 5 is provided with magnetic indicia 12, such as dashed lines, which convey information relating to the position of the conveyor belt 5. Here, for instance, the magnetic indicia 12 designate the packing areas on the conveyor belt 5. A scanner 13 located at a predetermined position along the conveyor belt 5 reads the magnetic indicia 12 relating to the positions of the packing areas, and then relays the decoded information to a controller (not shown). The controller advances the articles on the conveyor belt 5 by one packing unit until the scanner 13 encounters the next magnetic indicia 12.

Figure 5:
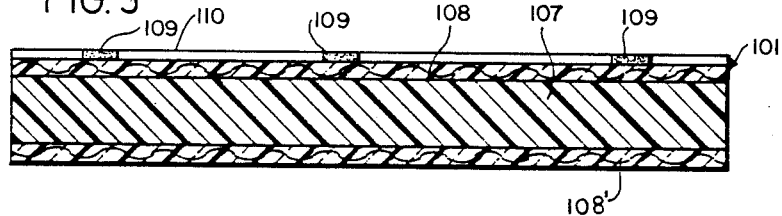
FIG. 5 is a cross-sectional view, similar to that of FIG. 2, of another exemplary embodiment of a conveyor belt constructed in accordance with the present invention.
Figure 6:
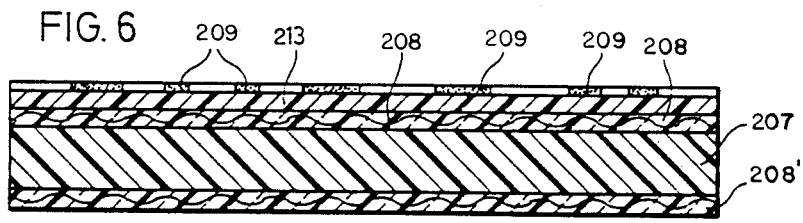
FIG. 6 is a cross-sectional view, similar to that of FIG. 2, of yet another exemplary embodiment of a conveyor belt constructed in accordance with the present invention.

Two other exemplary embodiments of a conveyor belt constructed in accordance with the present invention are illustrated in FIGS. 5 and 6, respectively. Elements illustrated in FIGS. 5 and 6 which correspond to the elements described above with respect to FIGS. 1 and 2 have been designated by corresponding reference numerals increased by one hundred and two hundred, respectively. The embodiments of FIGS. 5 and 6 function in the same manner as the embodiment illustrated in FIGS. 1 and 2 unless otherwise stated.

Referring now to FIG. 5, a conveyor belt 101 has first and second strips of fabric 108 and 108' attached to the outer and inner surfaces, respectively, of a primary belt 107. The first strip of fabric 108 has indicia 109 applied thereto by a transfer printing process. A film 110 of transparent plastic covers the first strip of fabric 108. This conveyor belt 101 is thin and therefore can be guided over relatively sharp edges instead of being guided over rotating rollers.

Referring now to FIG. 6, a conveyor belt 201 has first and second strips of fabric 208 and 208' attached to outer and inner surfaces, respectively, of a primary belt 207. A layer of thermoplastic 213 is attached to the primary belt 207 such that it covers the first strip of fabric 208. Indicia 209 are imprinted onto the outer surface of the thermoplastic layer 213 by a transfer printing process. The thermoplastic layer 213 is coated with a film 210 of transparent plastic.

It will be understood that the embodiments described herein are merely exemplary and that a person skilled in the art may make many variations and modifications without departing from the spirit and scope of the invention. All such modifications are intended to be included within the scope of the invention as defined in the appended claims.

We claim:

1. A conveyor belt adapted to transport articles placed thereon, comprising belt means for transporting articles thereon; advertising indicia, located on a visible surface of said belt means, whereby said conveyor belt is adapted for advertising purposes; and protective cover means for covering said visible surface of said belt means and for protecting said advertising indicia, said protective cover means being transparent, whereby said advertising indicia are visible through said protective cover means.

2. A conveyor belt according to claim 1, wherein said belt means is an endless belt.

3. A conveyor belt according to claim 2, wherein said endless belt includes a thermoplastic strip and tensile strength means attached to said thermoplastic strip for providing said thermoplastic strip with tensile strength.

4. A conveyor belt according to claim 3, wherein said thermoplastic strip has an outer surface and an inner surface, wherein said tensile strength means includes a strip of multi-ply fabric attached to said inner surface of said thermoplastic strip, and wherein said outer surface of said thermoplastic strip provides said visible surface.

5. A conveyor belt according to claim 3, wherein said thermoplastic strip has an outer surface and an inner surface, wherein said tensile strength means includes a first strip of multi-ply fabric attached to said inner surface of said thermoplastic strip and a second strip of multi-ply fabric having an inner surface and an outer surface, said inner surface of said second strip of multi-ply fabric being attached to said outer surface of said thermoplastic strip, and wherein said outer surface of said second strip of multi-ply fabric provides said visible surface.

6. A conveyor belt according to claim 3, wherein said thermoplastic strip has an outer surface and an inner surface, wherein said tensile strength means includes first and second strips of multi-ply fabric attached to said inner and outer surfaces of said thermoplastic strip, respectively, and another thermoplastic strip having an inner surface and an outer surface, said inner surface of said another thermoplastic strip of being attached to said second strip of multi-ply fabric, and wherein said outer surface of said another thermoplastic strip provides said visible surface.

7. A conveyor belt according to claim 1, wherein said advertising indicia includes letters.

8. A conveyor belt according to claim 1, wherein said advertising indicia includes images.

9. A conveyor belt according to claim 1, wherein said advertising indicia further includes encoded data.

10. A conveyor belt according to claim 9, wherein said encoded data is magnetizable.

11. A conveyor belt according to claim 1, wherein said protective cover means is a thin film of plastic.

12. A conveyor belt according to claim 11, wherein said thin film of plastic adds rigidity to said belt means.

13. In combination, a cashier's counter; and a conveyor belt located adjacent said cashier's counter, said conveyor belt having belt means for transporting articles placed thereon and advertising indicia positioned on a visible surface of said belt means so as to be within the field of view of customers located at said cashier's counter.

14. A combination according to claim 13, wherein said conveyor belt further includes protective cover means for covering said visible surface of said belt means and for protecting said advertising indicia, said protective cover means being transparent, whereby said advertising indicia is visible through said protective cover means.

15. A combination according to claim 14, wherein said protective cover means is a thin film of plastic.

16. A combination according to claim 13, wherein said advertising indicia includes letters.

17. A combination according to claim 13, wherein said advertising indicia includes images.

18. A combination according to claim 13, wherein said advertising indicia further includes encoded data.

19. A combination according to claim 18, wherein said encoded data is magnetizable.

20. A combination according to claim 19, wherein said magnetizable encoded data contains information for controlling the operation of said conveyor belt, and wherein said cashier's counter further includes optical reader means for reading said magnetizable encoded data located on said conveyor belt, decoding means for decoding said magnetizable encoded data read by said optical reader means, and control means for controlling the operation of said conveyor belt in accordance with said magnetizable encoded data.

21. A method of advertising using an endless conveyor belt located at a cashier's counter comprising the steps of providing a visible surface of the conveyor belt with advertising indicia such that the advertising indicia are within the field of view of customers located at the cashier's counter and rotating the conveyor belt, whereby the advertising indicia are repetitiously moved past customers located at the cashier's counter.

22. A method according to claim 21, wherein the advertising indicia are applied to the visible surface of the conveyor belt by a transfer printing process.

23. A method according to claim 21, further comprising the step of protecting the advertising indicia.

24. A method according to claim 23, wherein the advertising indicia are protected by covering the visible surface of the conveyor belt with a thin film of transparent plastic, whereby the advertising indicia area visible to customers through the thin film of transparent plastic.

* * * * *